United States Patent
Wu

(10) Patent No.: US 8,422,923 B2
(45) Date of Patent: Apr. 16, 2013

(54) PHOSPHATE ESTER POLYIMIDE CONTAINING INTERMEDIATE TRANSFER MEMBERS

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 238 days.

(21) Appl. No.: 12/869,119

(22) Filed: Aug. 26, 2010

(65) Prior Publication Data

US 2012/0049123 A1   Mar. 1, 2012

(51) Int. Cl.
*H01B 1/22* (2006.01)
*G03G 15/14* (2006.01)

(52) U.S. Cl.
USPC ...... 399/302; 252/500; 252/511; 252/519.33; 428/35.5; 428/475.5; 524/127

(58) Field of Classification Search ......... 252/500, 252/511, 519.33; 399/302; 428/35.5, 475.5; 524/127
See application file for complete search history.

(56) References Cited

U.S. PATENT DOCUMENTS

| | | |
|---|---|---|
| 5,487,707 A | 1/1996 | Sharf et al. |
| 6,139,784 A | 10/2000 | Oshima et al. |
| 6,318,223 B1 | 11/2001 | Yu et al. |
| 6,397,034 B1 | 5/2002 | Tarnawskyj et al. |
| 6,440,515 B1 | 8/2002 | Thornton et al. |
| 6,602,156 B2 | 8/2003 | Schlueter, Jr. |
| 7,031,647 B2 | 4/2006 | Mishra et al. |
| 7,130,569 B2 | 10/2006 | Goodman et al. |
| 7,139,519 B2 | 11/2006 | Darcy, III et al. |
| 2005/0207800 A1 | 9/2005 | Yamaguchi et al. |
| 2009/0079784 A1 | 3/2009 | Chiwata et al. |
| 2009/0142101 A1 | 6/2009 | Kosuge |
| 2009/0142685 A1 | 6/2009 | Nagatomo et al. |
| 2009/0297232 A1 | 12/2009 | Wu |
| 2010/0247918 A1 | 9/2010 | Wu |
| 2011/0105658 A1 | 5/2011 | Wu |

OTHER PUBLICATIONS

U.S. Appl. No. 12/413,638, filed Mar. 30, 2009.
U.S. Appl. No. 12/413,642, filed Mar. 30, 2009.
U.S. Appl. No. (not yet assigned), filed concurrently herewith.
Nov. 28, 2011, Search Report issued in German Patent Application No. 10 2011 080 882.5 (with partial English-translation).

*Primary Examiner* — Ana Woodward
(74) *Attorney, Agent, or Firm* — Eugene O. Palazzo

(57) ABSTRACT

An intermediate transfer media, such as a belt, that includes a modified phosphate ester polyimide and a conductive component, like carbon black.

15 Claims, No Drawings

PHOSPHATE ESTER POLYIMIDE CONTAINING INTERMEDIATE TRANSFER MEMBERS

CROSS REFERENCE TO RELATED APPLICATIONS

U.S. application Ser. No. 12/869,103 filed concurrently herewith, the disclosure of which is totally incorporated herein by reference, illustrates for example, an intermediate transfer member comprised of a phosphate ester, a polyamideimide, and a conductive component, with examples of phosphate esters being alkyl alcohol alkoxylate phosphate, or an alkyl phenol alkoxylate phosphate, and which phosphate esters can be selected for the intermediate transfer members of the present disclosure in embodiments thereof.

Copending U.S. application Ser. No. 12/413,638 filed Mar. 30, 2009, entitled Perfluoropolyether Polymer Grafted Polyaniline Containing Intermediate Transfer Members illustrates an intermediate transfer member comprised of a substrate and in contact with the substrate a polyaniline grafted perfluoropolyether phosphoric acid polymer.

Copending U.S. application Ser. No. 12/413,642 filed Mar. 30, 2009, entitled Fluorotelomer Grafted Polyaniline Containing Intermediate Transfer Members, the disclosure of which is totally incorporated herein by reference, illustrates an intermediate transfer member comprised of a substrate, and a layer comprised of polyaniline having grafted thereto a fluorotelomer.

Illustrated in U.S. application Ser. No. 12/129,995, filed May 30, 2008, entitled Polyimide Intermediate Transfer Components, is an intermediate transfer belt comprised of a substrate comprising a polyimide and a conductive component wherein the polyimide is cured at a temperature of from about 175 to about 290° C. over a period of time of from about 10 to about 120 minutes.

BACKGROUND

Disclosed are intermediate transfer members, and more specifically, intermediate transfer members useful in transferring a developed image in an electrostatographic, for example xerographic, including digital, image on image, and the like, machines or apparatuses, and printers, inclusive of office and production printers. In embodiments, there are selected intermediate transfer members comprised of a phosphate ester and a polyimide, and more specifically the reaction product of a phosphate ester and a polyamic acid (polyimide precursor) to form a phosphate modified polyimide, each of the two components of the phosphate ester and the polyamic acid being commercially available. In embodiments thereof, the phosphate ester and the polyimide may be dispersed in or mixed with a suitable polymer, such as those illustrated herein, like a polyimide or a polycarbonate.

A number of advantages are associated with the intermediate transfer members, such as belts (ITB) of the present disclosure, like excellent acceptable resistivity, a high modulus, of for example equal to or greater than about 3,000 MPa, such as from about 3,000 to about 7,000 MPa, and where coating of the phosphate ester modified polyimide after being applied to a substrate, such as a metal substrate, possesses self release characteristics from the metal substrate; an excellent maintained member conductivity for extended time periods; ITB humidity insensitivity for extended time periods; wear and abrasion resistance; and acceptable surface friction characteristics for aiding in the transfer of developed xerographic images.

In a typical electrostatographic reproducing apparatus, a light image of an original to be duplicated is recorded in the form of an electrostatic latent image upon a photosensitive member, and the latent image is subsequently rendered visible by the application of electroscopic thermoplastic resin particles and colorant. Generally, the electrostatic latent image is developed by using a developer mixture, which usually comprises carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a substrate such as paper. It can be advantageous to transfer the developed image to a coated intermediate transfer web, belt or component, and subsequently transfer with a high transfer efficiency, of for example from about 90 to about 95 percent, the developed image from the intermediate transfer member to a permanent substrate, like paper. The transferred toner image is subsequently usually fixed or fused by heat and pressure upon the substrate.

In electrostatographic printing machines wherein the toner image is electrostatically transferred by a potential difference between the imaging member and the intermediate transfer member, the transfer of the toner particles to the intermediate transfer member, and the retention thereof should be substantially complete so that the image ultimately transferred to the image receiving substrate will have a high resolution. Substantially about 100 percent toner transfer is desired when most or all of the toner particles comprising the image are transferred, and little residual toner remains on the surface from which the image was transferred.

In embodiments, it is desired to provide an intermediate transfer member, which has excellent transfer capabilities; is conductive, and more specifically, has excellent conductivity or resistivity as compared, for example, to an intermediate transfer member where the modified phosphate ester polyimide is absent; and possesses excellent humidity insensitivity characteristics leading to high developed image quality where developed images with minimal resolution issues can be obtained, and where the phosphate ester modified polyimide can be easily removed from substrates either automatically or by simple hand peeling, It is also desired to provide a weldable intermediate transfer belt that may not, but could, have puzzle cut seams, and instead, has a weldable seam, thereby providing a belt that can be manufactured without labor intensive steps, such as manually piecing together the puzzle cut seam with fingers, and without the lengthy high temperature and high humidity conditioning steps. It is also desired to provide an intermediate transfer member, which has excellent wear and abrasion resistance, and more specifically, has excellent mechanical properties as compared, for example, to an intermediate transfer member where a phosphate ester modified polyimide is absent.

References

Illustrated in U.S. Pat. No. 7,031,647 is an imageable seamed belt containing a lignin sulfonic acid doped polyaniline.

Disclosed in U.S. Pat. No. 6,397,034 polyimide intermediate transfer member layer treated with a carbon black filler.

Illustrated in U.S. Pat. No. 7,139,519 is an intermediate transfer belt comprising a belt with a welded seam comprising primarily a polyimide polymer.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of for example, from about 75 to about 98 percent by weight of total solids, wherein the polyaniline has a particle size diameter of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt.

Disclosed in U.S. Pat. No. 6,139,784 is a seamless belt containing a conductive powder and a polyimide resin, and more specifically, processes for the preparation of seamless belts.

Illustrated in U.S. Pat. No. 7,031,647 is an image able seamed belt containing a lignin sulfonic acid doped polyaniline.

Attempts at controlling the resistivity of intermediate transfer members by, for example, adding conductive fillers, such as ionic additives and/or carbon black thereto are disclosed in U.S. Pat. No. 6,397,034, which describes the use of a treated carbon filler in a polyimide intermediate transfer member layer. However, there can be problems associated with the use of such fillers in that undissolved particles frequently bloom or migrate to the surface of the fluorinated polymer and cause imperfections to the polymer, thereby causing nonuniform resistivity, which in turn causes poor antistatic properties and poor mechanical strength characteristics. Also, ionic additives on the ITB surface may interfere with toner release. Furthermore, bubbles may appear in the polymer, some of which can only be seen with the aid of a microscope, and others of which are large enough to be observed with the naked eye resulting in poor or nonuniform electrical properties and poor mechanical properties.

Illustrated in U.S. Pat. No. 7,139,519 is an intermediate transfer belt comprising a belt substrate comprising primarily at least one polyimide polymer, and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is usually labor intensive and costly, and the puzzle cut seam, in embodiments, is sometimes weak. The manufacturing process for a puzzle cut seamed belt usually involves a lengthy in time high temperature and a high humidity conditioning step. For the conditioning step, each individual belt is rough cut, rolled up, and placed in a conditioning chamber that is environmentally controlled at about 45° C. and about 85 percent relative humidity for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

It is known that carbon can be used as the conductive particles in several intermediate transfer belts, however, carbon can be difficult to disperse. Also, it can be difficult to generate carbon black based ITBs with consistent resistivity because, for example, the loading thereof is present on the vertical part of the percolation curve and the working window for carbon black is narrow to allow the use of robust manufacturing process. In addition, in humid environments, moisture will tend to deposit on the ITB during idle and cause wrinkles induced transfer failures and print defects. These and other disadvantages are minimized or in embodiments thereof substantially eliminated with the disclosed intermediate transfer members.

SUMMARY

In embodiments, there is disclosed an intermediate transfer member comprised of a substrate comprising a mixture of a conductive component like carbon black, and a phosphate ester reaction product; an intermediate transfer member comprised of a substrate comprising a mixture of a conductive component like carbon black, and the reaction product of a phosphate ester and a polyamic acid (polyimide precursor); an intermediate transfer member, such as an intermediate belt comprised of a supporting substrate such as a polyimide, a layer thereover comprising the reaction product of a phosphate ester and a polyamic acid, and a conductive component like carbon black or a metal oxide; an intermediate transfer member wherein the resisitivity thereof is from about $10^8$ to about $10^{13}$ ohm/square, from about $10^9$ to about $10^{12}$ ohm/square, and more specifically, from about $10^{19}$ to about $10^{11}$ ohm/square as measured with a known High Resistivity Meter; and self releasing characteristics of the phosphate ester polyamic acid reaction product and the conductive component coating from a metal substrate.

Embodiments

Aspects of the present disclosure relate to an intermediate transfer member comprised of a conductive material and a component selected from the group consisting of a poly(pyromellitic dianhydride/4,4-oxydianiline/nonylphenol ethoxylate phosphate)copolymer, a poly(pyromellitic dianhydride/phenylenediamine/nonylphenol ethoxylate phosphate)copolymer, a poly(biphenyl tetracarboxylic dianhydride/4,4'-oxydianiline/nonylphenol ethoxylate phosphate) copolymer, a poly(biphenyl tetracarboxylic dianhydride/phenylenediamine/nonylphenol ethoxylate phosphate) copolymer, poly(benzophenone tetracarboxylic dianhydride/4,4'-oxydianiline/phenylenediamine/nonylphenol ethoxylate phosphate)copolymer, a poly(pyromellitic dianhydride/4,4-oxydianiline/tridecyl alcohol ethoxylate phosphate)copolymer, a poly(pyromellitic dianhydride/phenylenediamine/tridecyl alcohol ethoxylate phosphate)copolymer, a poly(biphenyl tetracarboxylic dianhydride/4,4'-oxydianiline/tridecyl alcohol ethoxylate phosphate)copolymer, a poly(biphenyltetracarboxylic dianhydride/phenylenediamine/tridecyl alcohol ethoxylate phosphate)copolymer, a poly(benzophenone tetracarboxylic dianhydride/4,4'-oxydianiline/phenylenediamine/tridecyl alcohol ethoxylate phosphate)copolymer, a poly(pyromellitic dianhydride/4,4-oxydianiline/polyethylene glycol tridecyl ether phosphate) copolymer, a poly(pyromellitic dianhydride/phenylenediamine/polyethylene glycol tridecyl ether phosphate) copolymer, a poly(biphenyl tetracarboxylic dianhydride/4,4'- oxydianiline/polyethylene glycol tridecyl ether phosphate) copolymer, poly(biphenyl tetracarboxylic dianhydride/phenylenediamine/polyethylene glycol tridecyl ether phosphate)copolymer, and a poly(benzophenone tetracarboxylic dianhydride/4,4'-oxydianiline/phenylenediamine/polyethylene glycol tridecyl ether phosphate)copolymer; an intermediate transfer member comprised of a phosphate modified polyimide generated as the reaction product of a phosphate ester, as illustrated for example in the copending application recited herein, and a polyamic acid (polyimide precursor); carbon black, and an optional polymeric binder, wherein the phosphate ester is for example, an alkyl alcohol ethoxylate phosphate, an alkyl phenol ethoxylate phosphate, an alkyl polyethoxyethanol phosphate, an alkylphenoxy polyethoxyethanol phosphate, or mixtures thereof, the conductive component is for example, a carbon black, a metal oxide, a polyaniline, and other known suitable conductive components, and the polyimide precursor or the polyamic acid is for example, a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline/phenylenediamine, and mixtures thereof; an intermediate transfer belt comprised of the phosphate ester modified polyimide as illustrated herein, and carbon black, and where the phosphate ester modified polyimide functions primarily as a release agent (to release the polyimide ITB from the coating substrate, usually a metal substrate), and an optional polymeric binder, wherein the phosphate ester is an alkyl alcohol ethoxylate phosphate, an alkyl phenol ethoxylate phosphate, an alkyl polyethoxyethanol phosphate, or an alkylphenoxy polyethoxyethanol phosphate, and the polymeric binder is a polyimide, a polycarbonate, a polyamide-imide, a polyphenylene sulfide, a polyamide, a polysulfone, a polyetherimide, a polyester, a polyvinylidene fluoride, or a polyethylene-co-polytetrafluoroethylene, and where the ratio amount of the phosphate ester to the polyamic acid is between about 0.1/99.9 and about 4/96; and an apparatus for forming images on a recording medium comprising a charge retentive surface with an electrostatic latent image thereon; a development component to apply toner to the charge retentive surface; the intermediate transfer member illustrated herein and more specifically where the phosphate ester selected for the preparation of the phosphate ester modified polyimide functioning as release agent is an alkyl alcohol alkoxylate phosphate, an alkyl phenol alkoxylate phosphate, an alkyl polyalkoxyethanol phosphate, an alkylphenoxy polyalkoxyethanol phosphate, or mixtures thereof, where alkoxy contains for example, from 1 to about 16 carbon atoms, and alkyl contains for example, from about 1 to about 36 carbon atoms.

In embodiments of the present disclosure there is provided an intermediate transfer member comprised of phosphate ester modified polyimide generated from the esterification reaction product of a phosphate ester, and a polyamic acid; and which member also includes a conductive component; an intermediate transfer belt comprised of the reaction product of a phosphate ester and a polyamic acid and wherein said phosphate ester is an alkyl alcohol ethoxylate phosphate, an alkyl phenol ethoxylate phosphate, an alkyl polyethoxyethanol phosphate, or an alkylphenoxy polyethoxyethanol phosphate, and a carbon black; wherein the polyamic acid is one of polyamic acid of pyromellitic dianhydride/4,4-oxydianiline, polyamic acid of pyromellitic dianhydride/phenylenediamine, polyamic acid of biphenyl tetracarboxylic dianhydride/4,4'-oxydianiline, polyamic acid of biphenyl tetracarboxylic dianhydride/phenylenediamine, polyamic acid of benzophenone tetracarboxylic dianhydride/4,4'-oxydianiline/phenylenediamine, and mixtures thereof; and the reaction product is a phosphate modified polyimide of poly(pyromellitic dianhydride/4,4-oxydianiline/nonylphenol ethoxylate phosphate)copolymer, poly(pyromellitic dianhydride/phenylenediamine/nonylphenol ethoxylate phosphate) copolymer, poly(biphenyl tetracarboxylic dianhydride/4,4'-oxydianiline/nonylphenol ethoxylate phosphate)copolymer, poly(biphenyl tetracarboxylic dianhydride/phenylenediamine/nonylphenol ethoxylate phosphate)copolymer, poly(benzophenone tetracarboxylic dianhydride/4,4'-oxydianiline/phenylenediamine/nonylphenol ethoxylate phosphate)copolymer, poly(pyromellitic dianhydride/4,4-oxydianiline/tridecyl alcohol ethoxylate phosphate)copolymer, poly(pyromellitic dianhydride/phenylenediamine/tridecyl alcohol ethoxylate phosphate)copolymer, poly(biphenyl tetracarboxylic dianhydride/4,4'-oxydianiline/tridecyl alcohol ethoxylate phosphate)copolymer, poly(biphenyltetracarboxylic dianhydride/phenylenediamine/tridecyl alcohol ethoxylate phosphate)copolymer, poly(benzophenone tetracarboxylic dianhydride/4,4'-oxydianiline/phenylenediamine/tridecyl alcohol ethoxylate phosphate)copolymer, poly(pyromellitic dianhydride/4,4-oxydianiline/polyethylene glycol tridecyl ether phosphate)copolymer, poly(pyromellitic dianhydride/phenylenediamine/polyethylene glycol tridecyl ether phosphate)copolymer, poly(biphenyl tetracarboxylic dianhydride/4,4'-oxydianiline/polyethylene glycol tridecyl ether phosphate)copolymer, poly(biphenyl tetracarboxylic dianhydride/phenylenediamine/polyethylene glycol tridecyl ether phosphate)copolymer, poly(benzophenone tetracarboxylic dianhydride/4,4'-oxydianiline/phenylenediamine/polyethylene glycol tridecyl ether phosphate)copolymer, and the like and mixtures thereof, and wherein the reaction product is formed by heating at a temperature of from about 200 to about 325 degrees Centigrade; an intermediate transfer belt comprised of the reaction product of a phosphate ester and a polyamic acid and wherein the phosphate ester is an alkyl alcohol ethoxylate phosphate, an alkyl phenol ethoxylate phosphate, an alkyl polyethoxyethanol phosphate, or an alkylphenoxy polyethoxyethanol phosphate, and a carbon black; wherein said polyamic acid is a polyamic acid of pyromellitic dianhydride/4,4-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline/phenylenediamine, and mixtures thereof; and wherein said phosphate ester reacts with the polyamic acid by esterification and simultaneously, the polyamic acid itself imidizes, resulting in the phosphate ester modified polyimide; an intermediate transfer member wherein the phosphate ester possesses an ethoxy (EO) mole number, as measured by NMR nuclear magnetic resonance, of from about 1 to about 40 and the conductive component is a carbon black, a polyaniline or a metal oxide; and an intermediate transfer member wherein phosphate ester possesses an ethoxy (EO) mole number, as measured by NMR nuclear magnetic resonance, of from about 2 to about 20; and the phosphate ester is a tridecyl alcohol ethoxylate phosphate, a polyethylene glycol monotridecyl ether phosphate, tristyrylphenol ethoxylate phosphate, or a nonylphenol ethoxylate phosphate; intermediate transfer belt in accordance the phosphate ester alkoxy is methoxy, ethoxy, propoxy, butoxy, or pentoxy, and the phosphate ester alkyl is methyl, ethyl, propyl, butyl, or pentyl; an intermediate transfer member wherein the polyamic acid is present in an amount of from about 98 to about 99.5 weight percent, the phosphate ester is present in an amount of from about 0.5 to about 2 weight percent, and where the phosphate ester reaction occurs at a temperature of from about 225 to about 310° C.; an intermediate transfer belt wherein the phosphate ester reaction product and a conductive component, like carbon black or a metal oxide are mixed with a solvent selected from a group consisting of methylene chloride, tetrahydrofuran, toluene, monochlorobenzene, N-methyl-2-pyrrolidone, N,N-dimethylformamide, N,N-dimethylacetamide, methyl ethyl ketone, methyl isobutyl ketone, and mixtures thereof, to form a dispersion thereof.

Examples of phosphate esters selected for reaction with a polyamic acid, such as a polyamic acid of pyromellitic dianhydride/4,4-oxydianiline, include a number of known phosphate esters, and more specifically, where the phosphate ester is a phosphate ester of alkyl alcohol alkoxylate such as alkyl alcohol ethoxylate, alkyl phenol alkoxylate such as alkyl phenol ethoxylate, alkyl polyethoxyethanol such as alkyl polyalkoxyethanol, alkylphenoxy polyalkoxyethanol such as alkylphenoxy polyethoxyethanol, mixtures thereof, and the corresponding alkoxy esters wherein alkyl and alkoxy contain, for example, from 1 to about 36 carbon atoms, from 1 to about 18 carbon atoms, from 1 to about 12 carbon atoms, and from 1 to about 6 carbon atoms, optionally mixtures thereof, and the like. The number average molecular weight of the phosphate ester is for example, from about 200 to about 2,000, or from about 300 to about 800; and the weight average molecular weight of the phosphate ester is for example, from about 250 to about 8,000, or from about 400 to about 2,000, which molecular weights are as reported by the vendor or as measured by GPC analysis.

In embodiments of the present disclosure examples of phosphate esters of alkyl alcohol ethoxylate include POLYSTEP® P-11, P-12 and P-13 (tridecyl alcohol ethoxylate phosphate, available from STEPAN Company, Northfield, Ill.) with an average mole number of ethoxy (EO) of about 3, 6 and 12, respectively, that is for example, one POLYSTEP® P-11 molecule has three ethoxy groups or segments (EO) [—CH$_2$CH$_2$O—CH$_2$CH$_2$O—CH$_2$CH$_2$O—] in its structure. The average mole number of ethoxy can be determined by known methods and more specifically for example, for a single phosphate ester, like POLYSTEP® P-11 which has three ethoxys (EO) of [—CH$_2$CH$_2$O—CH$_2$CH$_2$O—CH$_2$CH$_2$O—] in its structure; Other examples of phosphate esters of alkyl alcohol ethoxylate include trioctyl alcohol ethoxylate phosphate, trihexyl alcohol ethoxylate phosphate, triheptyl alcohol ethoxylate phosphate or tripentyl alcohol ethoxylate phosphate.

In embodiments of the present disclosure examples of phosphate esters of alkyl phenol ethoxylates include POLYSTEP® P-31, P-32, P-33, P-34 and P-35 (nonylphenol ethoxylate phosphate, available from STEPAN Company, Northfield, Ill.) with an average mole number of ethoxy (EO) of about 4, 6, 8, 10 and 12, respectively. Other examples of phosphate esters of alkyl phenol ethoxylates include octylphenol ethoxylate phosphate, hexylphenol ethoxylate phosphate, decylphenol ethoxylate phosphate, or heptylphenol ethoxylate phosphate.

Examples of phosphate esters of alkyl polyethoxyethanol include STEPFAC™ 8180, 8181 and 8182 (polyethylene glycol tridecyl ether phosphate, available from STEPAN Company, Northfield, Ill.) with an average mole number of ethoxy (EO) of about 3, 6 and 12, respectively. Other examples of phosphate esters of alkyl polyethoxyethanol include polyethylene glycol trioctyl ether phosphate, polyethylene glycol triheptyl ether phosphate, polyethylene glycol trihexyl ether phosphate, or polyethylene glycol tripentyl ether phosphate.

Examples of phosphate esters of alkylphenoxy polyethoxyethanol include STEPFAC™ 8170, 8171, 8172, 8173, 8175 (nonylphenol ethoxylate phosphate, available from STEPAN Company, Northfield, Ill.) with an average mole number of ethoxy (EO) of about 10, 6, 4, 8 and 12, respectively, and TSP-PE (tristyrylphenol ethoxylate phosphate, available from STEPAN Company, Northfield, Ill.) with an average mole number of ethoxy (EO) of about 16. Other examples of phosphate esters of alkylphenoxy polyethoxyethanol include octylphenol ethoxylate phosphate, decylphenol ethoxylate phosphate, heptylphenol ethoxylate phosphate, or hexylphenol ethoxylate phosphate.

Various amounts of the phosphate ester can be selected for the reaction, such as for example, from about 0.1 to about 15 weight percent, from 0.2 to about 5 weight percent, or from 0.5 to about 3 weight percent.

In embodiments of the present disclosure examples of the polyamic acid selected for reaction with the phosphate ester include the polyamic acid of pyromellitic dianhydride/4,4-oxydianiline, the polyamic acid of pyromellitic dianhydride/phenylenediamine, the polyamic acid of biphenyl tetracarboxylic dianhydride/4,4'-oxydianiline, the polyamic acid of biphenyl tetracarboxylic dianhydride/phenylenediamine, the polyamic acid of benzophenone tetracarboxylic dianhydride/4,4'-oxydianiline/phenylenediamine, and mixtures thereof.

In embodiments commercially available examples of the polyamic acids selected for the reaction with a phosphate ester are pyromellitic dianhydride/4,4-oxydianilines of for example, PYRE-ML RC5019 (about 15-16 weight percent in N-methyl-2-pyrrolidone, NMP), RC5057 (about 14.5-15.5 weight percent in NMP/aromatic hydrocarbon=80/20), RC5083 (about 18-19 weight percent in NMP/DMAc=15/85), all from Industrial Summit technology Corp., Parlin, N.J.; RP46 and RP50 (about 18 weight percent in NMP), both obtained from Unitech Corp., Hampton, Va.; DURIMIDE® 100, commercially available from FUJIFILM Electronic Materials U.S.A., Inc.

Commercially available examples of polyamic acid are biphenyl tetracarboxylic dianhydride/4,4'-oxydianilines of U-VARNISH A and S (about 20 weight in NMP), both available from UBE America Inc., New York, N.Y.

In embodiments commercially available examples of polyamic acid are di-(2,3-dicarboxyphenyl)-ether dianhydride with 5-amino-1-(p-aminophenyl)-1,3,3-trimethylindane such as XU 218, available from Ciba-Geigy Corporation, Ardsley, N.Y.

Additionally, in embodiments of the present disclosure examples of polyamic acids or esters of polyamic acid examples that can be selected as a reactant are generated from the reaction of a dianhydride and a diamine. Suitable dianhydrides include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis((3,4-dicarboxyphenoxy)phenyl)hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl)sulfide dianhydride, di-(3,4-dicarboxyphenyl)methane dianhydride, di-(3,4-dicarboxyphenyl)ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 4,4'-diphenylsulfidedioxybis(4-phthalic acid) dianhydride, 4,4'-diphenylsulfonedioxybis(4-phthalic acid) dianhydride, methylenebis(4-phenyleneoxy-4-phthalic acid) dianhydride, ethylidenebis(4-phenyleneoxy-4-phthalic acid) dianhydride, isopropylidenebis-(4-phenyleneoxy-4-phthalic acid)dianhydride, hexafluoroisopropylidenebis(4-phenyleneoxy-4-phthalic acid)dianhydride, and the like. Exemplary diamines suitable for use in the preparation of the polyamic acid include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diaminoazobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluoro-biphenyl, 4,4'-diamino-2,2',3,3',5,5',6,6'-octafluorodiphenyl ether, bis[4-(3-aminophenoxy)-phenyl] sulfide, bis[4-(3-aminophenoxy)phenyl]sulfone, bis[4-(3-aminophenoxy)phenyl]ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane, and the like and mixtures thereof and more specifically where the dianhydride is one of 3,3',4,4'-tetracarboxybiphenyl dianhydride, 3,3',4,4'-tetracarboxybenzophenone dianhydride, and 2,3,6,7-naphthalenetetracarboxylic dianhydride, and the diamine is one of 4,4'-diaminobiphenyl, 1,3-diaminobenzene, or 4,4'-diaminodiphenyl ether.

Various amounts of polyamic acid can be selected for the reaction with the phosphate ester, such as for example, from about 90 to about 99.9 weight percent, from 95 to about 99.8 weight percent, or from 97 to about 99.5 weight percent.

The dianhydrides and diamines in embodiments are, for example, selected in a weight ratio of dianhydride to diamine of from about 20:80 to about 80:20, and more specifically, in an about 50:50 weight ratio. The above aromatic dianhydride like aromatic tetracarboxylic acid dianhydrides and diamines like aromatic diamines are used singly or as a mixture, respectively. The reaction occurs at about from about 180 to about 250° C. for a period of from about 2 to about 18 hours, resulting in a corresponding polyamic acid (polyimide precursor).

The disclosed intermediate transfer member comprises a phosphate ester modified polyimide, where the phosphate ester modified polyimide is in situ formed during the curing process of the intermediate transfer member. The intermediate transfer member coating solution comprises a phosphate ester, a polyamic acid (polyimide precursor) and a solvent such as NMP or DMAc. After coating on a metal substrate, the solvent is evaporated first at about 190° C. for about 30 minutes, and the reaction between the phosphate ester and the polyamic acid occurs in situ with further curing at higher temperatures such as from about 250 to about 320° C. for additional period of time, such as one hour. Both imidization and esterification occur during the curing or heating process.

The phosphate ester, and the polyamic acid can be mixed and heated together with the conductive component, in a solvent, like NMP to form a dispersion thereof, and then the resulting mixture can be applied to or coated on a metal substrate using known draw bar coating methods. The resulting film or films can be dried at high temperatures, such as from about 100 to about 400° C., from about 190 to about 320° C., for a sufficient period of time, such as for example, from about 60 to about 240 minutes, or from about 120 to about 180 minutes while remaining on the metal substrate. During the drying process, the phosphate ester modified polyimide is in situ formed from the aforementioned imidization and esterification reactions. After drying and cooling to room temperature, about 25° C. the about 50 to about 150 microns thick films formed are released from the metal substrate, without any tools and with hand peeling.

Additionally there can be added to the phosphate ester coating mixture, a polysiloxane copolymer primarily to provide for a smooth coating surface or as a leveling agent and which copolymers include a polyester modified polydimethylsiloxane, commercially available from BYK Chemical with the trade name of BYK® 310 (about 25 weight percent in xylene) and 370 (about 25 weight percent in xylene/alkylbenzenes/cyclohexanone/monophenylglycol=75/11/7/7); a polyether modified polydimethylsiloxane, commercially available from BYK Chemical with the trade name of BYK® 330 (about 51 weight percent in methoxypropylacetate) and 344 (about 52.3 weight percent in xylene/isobutanol=4/1), BYK®-SILCLEAN 3710 and 3720 (about 25 weight percent in methoxypropanol); a polyacrylate modified polydimethylsiloxane, commercially available from BYK Chemical with the trade name of BYK®-SILCLEAN 3700 (about 25 weight percent in methoxypropylacetate); a polyester polyether modified polydimethylsiloxane, commercially available from BYK Chemical with the trade name of BYK® 375 (about 25 weight percent in Di-propylene glycol monomethyl ether), present in an amount of from about 0.01 to about 1 weight percent, or from about 0.05 to about 0.5 weight percent of the total intermediate transfer member components.

The reaction products can be one of poly(pyromellitic dianhydride/4,4-oxydianiline/nonylphenol ethoxylate phosphate)copolymer, poly(pyromellitic dianhydride/phenylenediamine/nonylphenol ethoxylate phosphate)copolymer, poly(biphenyl tetracarboxylic dianhydride/4,4'-oxydianiline/nonylphenol ethoxylate phosphate)copolymer, poly(biphenyl tetracarboxylic dianhydride/phenylenediamine/nonylphenol ethoxylate phosphate)copolymer, poly (benzophenone tetracarboxylic dianhydride/4,4'-oxydianiline/phenylenediamine/nonylphenol ethoxylate phosphate)copolymer, poly(pyromellitic dianhydride/4,4-oxydianiline/tridecyl alcohol ethoxylate phosphate)copolymer, poly(pyromellitic dianhydride/phenylenediamine/tridecyl alcohol ethoxylate phosphate)copolymer, poly(biphenyl tetracarboxylic dianhydride/4,4'-oxydianiline/tridecyl alcohol ethoxylate phosphate)copolymer, poly(biphenyl tetracarboxylic dianhydride/phenylenediamine/tridecyl alcohol ethoxylate phosphate)copolymer, poly(benzophenone tetracarboxylic dianhydride/4,4'-oxydianiline/phenylenediamine/tridecyl alcohol ethoxylate phosphate)copolymer, poly(pyromellitic dianhydride/4,4-oxydianiline/polyethylene glycol tridecyl ether phosphate)copolymer, poly(pyromellitic dianhydride/phenylenediamine/polyethylene glycol tridecyl ether phosphate)copolymer, poly(biphenyl tetracarboxylic dianhydride/4,4'-oxydianiline/polyethylene glycol tridecyl ether phosphate)copolymer, poly(biphenyl tetracarboxylic dianhydride/phenylenediamine/polyethylene glycol tridecyl ether phosphate)copolymer, poly(benzophenone tetracarboxylic dianhydride/4,4'-oxydianiline/phenylenediamine/polyethylene glycol tridecyl ether phosphate)copolymer, and the like and mixtures thereof.

In embodiments the intermediate transfer member further comprises a conductive component, such as a carbon black, a metal oxide or a polyaniline, present in the phosphate ester modified polyimide coating mixture in an amount for example, of from about 1 to about 60 weight percent, from about 3 to about 40 weight percent, or more specifically from about 5 to about 20 weight percent.

The conductivity of carbon black is dependent on its surface area and its structure primarily. Generally, the higher the surface area and the higher the structure, the more conductive is the carbon black. Surface area is measured by the B.E.T. nitrogen surface area per unit weight of carbon black, and is the measurement of the primary particle size. Structure is a complex property that refers to the morphology of the primary aggregates of carbon black. It is a measure of both the number of primary particles comprising primary aggregates, and the manner in which they are "fused" together. High structure carbon blacks are characterized by aggregates comprised of many primary particles with considerable "branching" and "chaining", while low structure carbon blacks are characterized by compact aggregates comprised of fewer primary particles. Structure is measured by dibutyl phthalate (DBP) absorption by the voids within carbon blacks. The higher the structure, the more the voids, and the higher the DBP absorption.

Examples of carbon blacks selected as the conductive component for the phosphate modified polyimide include VULCAN° carbon blacks, REGAL carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 m$^2$/g, DBP absorption=1.05 ml/g), BLACK PEARLS® 880 (B.E.T. surface area=240 m$^2$/g, DBP absorption=1.06 ml/g), BLACK PEARLS® 800 (B.E.T. surface area=230 m$^2$/g, DBP absorption=0.68 ml/g), BLACK PEARLS® L (B.E.T. surface area=138 m$^2$/g, DBP absorption=0.61 ml/g), BLACK PEARLS® 570 (B.E.T. surface area=110 m$^2$/g, DBP absorption=1.14 ml/g), BLACK PEARLS® 170 (B.E.T. surface area=35 m$^2$/g, DBP absorption=1.22 ml/g), VULCAN® XC72 (B.E.T. surface area=254 m$^2$/g, DBP absorption=1.76 ml/g), VULCAN® XC72R (fluffy form of VULCAN® XC72), VULCAN® XC605, VULCAN® XC305, REGAL® 660 (B.E.T. surface area=112 m$^2$/g, DBP absorption=0.59 ml/g), REGAL® 400 (B.E.T. surface area=96 m$^2$/g, DBP absorption=0.69 ml/g), REGAL® 330 (B.E.T. surface area=94 m$^2$/g, DBP absorption=0.71 ml/g), MONARCH® 880 (B.E.T. surface area=220 m$^2$/g, DBP absorption=1.05 ml/g, primary particle diameter=16 nanometers), and MONARCH® 1000 (B.E.T. surface area=343 m$^2$/g, DBP absorption=1.05 ml/g, primary particle diameter=16 nanometers); Channel carbon blacks available from Evonik-Degussa; Special Black 4 (B.E.T. surface area=180 m$^2$/g, DBP absorption=1.8 ml/g, primary particle diameter=25 nanometers), Special Black 5 (B.E.T. surface area=240 m$^2$/g, DBP absorption=1.41 ml/g, primary particle diameter=20 nanometers), Color Black FW1 (B.E.T. surface area=320 m$^2$/g, DBP absorption=2.89 ml/g, primary particle diameter=13 nanometers), Color Black FW2 (B.E.T. surface area=460 m$^2$/g, DBP absorption=4.82 ml/g, primary particle diameter=13 nanometers), and Color Black FW200 (B.E.T. surface area=460 m$^2$/g, DBP absorption=4.6 ml/g, primary particle diameter=13 nanometers). In embodiments carbon black examples are Special Black 4 or Color Black FW1, present in an amount of from about 5 to about 20 weight percent of the intermediate transfer member.

As metal coating substrates, there can be selected stainless steel, aluminum, nickel, copper, and their alloys, and which substrates can be in the configuration of a flexible belt or a rigid drum.

Examples of solvents selected for the phosphate modified polyimide conductive component mixture reaction include, for example, alkylene halides such as methylene chloride, tetrahydrofuran, toluene, monochlorobenzene, N-methyl-2-pyrrolidone, N,N-dimethylformamide, N,N-dimethylacetamide, methyl ethyl ketone, methyl isobutyl ketone, mixtures thereof, and the like. The solvent can be present in an amount of from about 70 to about 90 weight percent of the ITB coating dispersion.

The surface resistivity of the disclosed intermediate transfer member is, for example, from about $10^9$ to about $10^{13}$ ohm/square, or from about $10^{10}$ to about $10^{12}$ ohm/square as measured by a High Resistivity meter. The conductivity is the reciprocal of the resistivity.

The intermediate transfer members illustrated herein like intermediate transfer belts can be selected for a number of printing and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems may be in the configuration of a sheet, a web, a belt, including an endless belt, and an endless seamed flexible belt; a roller, a film, a foil, a strip, a coil, a cylinder, a drum, an endless strip, and a circular disc. The intermediate transfer member can be comprised of a single layer, or can be comprised of several layers, such as from about 2 to about 5 layers. In embodiments, the intermediate transfer member further includes an outer release layer.

In embodiments, release layer examples situated on and in contact with the phosphate ester modified polyimide, conductive mixture include low surface energy materials, such as TEFLON®-like materials including fluorinated ethylene propylene copolymer (FEP), polytetrafluoroethylene (FIFE), polyfluoroalkoxy polytetrafluoroethylene (PFA TEFLON®), and other TEFLON®-like materials; silicone materials, such as fluorosilicones and silicone rubbers, such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture, with a molecular weight $M_W$ of approximately 3,500); and fluoroelastomers, such as those sold as VITON®, such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two known fluoroelastomers are comprised of (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomer can be those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers.

The release layer or layers may be deposited on the layer of the phosphate ester modified polyimide as illustrated herein by well known coating processes. Known methods for forming the outer layer include dipping, spraying such as by multiple spray applications of very thin films, casting, flow-coating, web-coating, roll-coating, extrusion, molding, or the like. Usually it is desirable to deposit the layers by spraying such as by multiple spray applications of very thin films, casting, by web coating, by flow-coating, and more specifically, by laminating.

The circumference of the intermediate transfer member, especially as it is applicable to a film or a belt configuration, is, for example, from about 275 to about 2,700 millimeters, from about 1,700 to about 2,600 millimeters, or from about 2,000 to about 2,200 millimeters with a corresponding width of, for example, from about 100 to about 1,000 millimeters, from about 200 to about 500 millimeters, or from about 300 to about 400 millimeters.

Specific embodiments will now be described in detail. These examples are intended to be illustrative, and are not limited to the materials, conditions, or process parameters set forth. All parts are percentages by weight of total solids unless otherwise indicated.

EXAMPLE I

One half of a percent of the phosphate ester, POLYSTEP® 34 (nonyiphenol ethoxylate phosphate with an average mole number of ethoxy of about 10) as obtained from STEPAN Company, Northfield, Ill., was mixed and reacted with 94.3 weight percent of the polyamic acid (polyimide precursor), PYRE-ML RC5019 (about 15-16 weight percent in N-methyl-2-pyrrolidone, NMP) as obtained from Industrial Summit technology Corp., Parlin, N.J., 5 weight percent of the carbon black, Color Black FW1 (B.E.T. surface area=320 $m^2$/g, DBP absorption=2.89 ml/g, primary particle diameter=13 nanometers) as obtained from Evonik-Degussa, 0.2 weight percent of the polyester modified polydimethylsiloxane, BYK® 310 (about 25 weight percent in xylene) as obtained from BYK Chemicals, and an appropriate amount of the solvent, NMP to adjust the total solid content of about 17 weight percent followed by ball milling the resulting mixture with 2 millimeter stainless shot with an Attritor for 1 hour.

The above resulting dispersion was then coated on a stainless steel substrate of a thickness of 0.5 millimeter using the known draw bar coating method and subsequently the coated dispersion was dried at 125° C. for 20 minutes, at 190° C. for 40 minutes and at 320° C. for 60 minutes while remaining on the steel substrate. During the drying process, the phosphate ester modified polyimide was in situ formed from the imidization and esterification reactions between the phosphate ester and the polyamic acid, resulting the formation of a poly(pyromellitic dianhydride/4,4-oxydianiline/nonylphenol ethoxylate phosphate)copolymer.

The above resulting dried coating of the poly(pyromellitic dianhydride/4,4-oxydianiline/nonylphenol ethoxylate phosphate)copolymer mixture self released in about 6 seconds, with no outside aids or tools, from the stainless steel substrate, and an about 100 micron thick intermediate transfer member film resulted where the ratio of the polyimide/carbon black/phosphate ester/polyester modified polysiloxane was 94.3/5/0.5/0.2.

EXAMPLE II

One half of percent of the phosphate ester, STEPFAC® 8171 (nonylphenol ethoxylate phosphate with an average mole number of ethoxy of about 6) as obtained from STEPAN Company, Northfield, Ill., was mixed with 84.5 weight percent of the polyamic acid (polyimide precursor), PYRE-ML RC5083 (about 18-19 weight percent in NMP/DMAc=15/85) as obtained from Industrial Summit technology Corp., Parlin, N.J., 15 weight percent of the carbon black, Special Black 4 (B.E.T. surface area=180 $m^2$/g, DBP absorption=1.8 ml/g, primary particle diameter=25 nanometers) as obtained from Evonik-Degussa, and appropriate amount of the solvent, NMP to adjust the total solid content to about 17 weight percent, followed by ball milling and mixing the resulting mixture with 2 millimeter stainless shot in an Attritor for 3 hours.

The above resulting dispersion was then coated on a stainless steel substrate of a thickness of 0.5 millimeter using the known draw bar coating method and subsequently the dispersion was dried at 125° C. for 20 minutes, at 190° C. for 40 minutes and at 320° C. for 60 minutes while remaining on the steel substrate. During the drying process, the phosphate ester modified polyimide was in situ formed from the imidization and esterification reactions between the phosphate ester and the polyamic acid, resulting in the formation of a poly(pyromellitic dianhydride/4,4-oxydianiline/nonylphenol ethoxylate phosphate)copolymer.

The above resulting dried coating self released, with no outside aids or tools, from the stainless steel substrate, and an about 100 micron thick intermediate transfer member film resulted where the ratio of the polyimide/carbon black/phosphate ester was 84.5/15/0.5.

COMPARATIVE EXAMPLE 1

The process of Example II was repeated except that there was omitted 0.5 percent of the phosphate ester, STEPFAC® 8171. Eighty-five weight percent of the polyamic acid (polyimide precursor), PYRE-ML RC5083 (about 18-19 weight percent in NMP/DMAc=15/85) as obtained from Industrial Summit technology Corp., Partin, N.J., was mixed with 15 weight percent of the carbon black, Special Black 4 (B.E.T. surface area=180 m$^2$/g, DBP absorption=1.8 ml/g, primary particle diameter=25 nanometers) as obtained from Evonik-Degussa, and appropriate amount of the solvent, NMP to adjust the total solid content of about 17 weight percent, followed by ball milling the resulting mixture with 2 millimeter stainless shot with an Attritor for 3 hours.

The resulting dispersion was then coated on a stainless steel substrate of a thickness of 0.5 millimeter using the known draw bar coating method and subsequently dried at 125° C. for 20 minutes, at 190° C. for 40 minutes and at 320° C. for 60 minutes while remaining on the steel. The film did not release from the steel substrate even after immersing in water for 48 hours. The resulting intermediate transfer member film comprised the polyimide/carbon black in a ratio of 85/15.

EXAMPLE III

One half of one percent of the phosphate ester, POLYSTEP® 34 (nonylphenol ethoxylate phosphate with an average mole number of ethoxy of about 10) as obtained from STEPAN Company, Northfield, Ill., was mixed with 94.3 weight percent of the polyamideimide, VYLOMAX® HR-11NN (15 weight percent solution in N-methylpyrrolidone, T$_g$=300° C., and M$_w$=45,000) as obtained from Toyobo Company, 5 weight percent of the carbon black, Color Black FW1 (B.E.T. surface area=320 m$^2$/g, DBP absorption=2.89 ml/g, primary particle diameter=13 nanometers) as obtained from Evonik-Degussa, 0.2 weight percent of the polyester modified polydimethylsiloxane, BYK® 310 (about 25 weight percent in xylene) as obtained from BYK Chemicals, and appropriate amount of the solvent, NMP to adjust the total solid content of about 15 weight percent, followed by ball milling the resulting mixture with 2 millimeter stainless shot with an Attritor for 1 hour.

The above resulting dispersion was then coated on a stainless steel substrate of a thickness of 0.5 millimeter using the known draw bar coating method and subsequently dried at 125° C. for 20 minutes, and then at 190° C. for an additional 40 minutes while remaining on the steel substrate.

The resulting dried coating self released, with no outside aids or tools, from the stainless steel substrate, and an about 100 micron thick intermediate transfer member film resulted where the ratio of the polyamideimide/carbon black/phosphate ester/polyester modified polysiloxane was 94.3/5/0.5/0.2.

Surface Resistivity Measurement

The above ITB members of Examples I, and II and Comparative Examples 1 and 2, were measured for surface resistivity (averaging four to six measurements at varying spots, 72° F./50 percent room humidity) using a High Resistivity Meter (Hiresta-Up MCP-HT450 from Mitsubishi Chemical Corp.); Youngs Modulus, and coating release characteristics. The results are provided in Table 1.

TABLE 1

| | Surface resistivity (ohm/square) | Young's modulus (MPa) | Release from the metal substrate |
|---|---|---|---|
| Example I, polyimide/phosphate ester | $3.5 \times 10^{10}$ | 4,800 | Self release |
| Example II, polyimide/phosphate ester | $4.1 \times 10^{10}$ | 3,700 | Self release |
| Example III, polyamideimide/phosphate ester | $3.9 \times 10^{10}$ | 3,400 | Self release |
| Comparative Example 1, polyamideimide/phosphate ester | $3.9 \times 10^{10}$ | 3,400 | Did Not Self Release |

The above ITB members exhibited functional surface resistivity, within the working range of from about $10^9$ to about $10^{13}$ ohm/square. "Self release" refers for example, that the resulting ITB releases from the metal coating substrate within 6 seconds; and "Do not release" refers for example, that the resulting ITB doe not release from the metal coating substrate for months.

Young's Modulus Measurement

The above ITB members of Examples I, II, and III, were measured for Young's modulus following the known ASTM D882-97 process. The modulus of the Comparative Example 1 ITB member was not measured since a freestanding film was unable to be obtained since it did not release from the coating steel substrate. An ITB sample of Examples I, II and III, (0.5 inch×12 inch) was placed in the measurement apparatus, the Instron Tensile Tester, and then elongated at a constant pull rate until breaking. During this time, there was recorded the resulting load versus the sample elongation. The modulus was calculated by taking any point tangential to the initial linear portion of this curve and dividing the tensile stress by the corresponding strain. The tensile stress was given by the load divided by the average cross sectional area of each of the test samples.

The ITB members of Examples I and II exhibited excellent modulus, which is comparable to that of the Comparative Example 1 polyimide/carbon black ITB without the phosphate ester (about 3,400 MPa). The addition of the phosphate ester into the polyimide ITB did not negatively affect its mechanical properties.

The disclosed prototype polyimide/phosphate ester ITB possessed comparable properties to the above ITB at about 20% lower cost for manufacturing due to its self release from the coating substrate, thus eliminating the extra release layer coating, which is required for releasing the polyimide ITB with no addition of the phosphate ester.

In copending application 20100220 there is disclosed an intermediate transfer member comprising a phosphate ester, a polyamideimide and a carbon black, which member self released from the coating metal substrate, and where the phosphate ester was physically mixed with the polyamideimide, and there is no any chemical reaction occurring between the two even when heated to high temperatures such as above 180° C. In contrast, when the polyamic acid (polyimide precursor) was selected as a reactant, the phosphate ester chemically reacted with the polyamic acid in situ during the drying process. As a result, the CTE (thermal expansion coefficient) of the polyamideimide/phosphate ester ITB (Comparative Example 2) was measured to be about 70 ppm using the Thermo-mechanical Analyzer (TMA); and the CTE of the phosphate ester reaction product of the ITB (Example I) was about 50 ppm, about a 30% reduction in CTE. Lower CTE is always desirable for ITB since the ITB dimension expands less when the operational temperature increases.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of phosphate ester modified polyimide generated from the esterification reaction product of a phosphate ester, and a polyamic acid; and a conductive component, and wherein said phosphate ester modified polyimide is selected from the group consisting of a poly(pyromellitic dianhydride/4,4-oxydianiline/nonylphenol ethoxylate phosphate) copolymer, a poly(pyromellitic dianhydride/phenylenediamine/nonylphenol ethoxylate phosphate) copolymer, a poly(biphenyl tetracarboxylic dianhydride/4,4'-oxydianiline/nonylphenol ethoxylate phosphate) copolymer, a poly(biphenyl tetracarboxylic dianhydride/phenylenediamine/nonylphenol ethoxylate phosphate) copolymer, poly(benzophenone tetracarboxylic dianhydride/4,4'-oxydianiline/phenylenediamine/nonylphenol ethoxylate phosphate) copolymer, a poly(pyromellitic dianhydride/4,4-oxydianiline/tridecyl alcohol ethoxylate phosphate) copolymer, a poly(pyromellitic dianhydride/phenylenediamine/tridecyl alcohol ethoxylate phosphate) copolymer, a poly(biphenyl tetracarboxylic dianhydride/4,4'-oxydianiline/tridecyl alcohol ethoxylate phosphate) copolymer, a poly(biphenyl tetracarboxylic dianhydride/phenylenediamine/tridecyl alcohol ethoxylate phosphate) copolymer, a poly(benzophenone tetracarboxylic dianhydride/4,4'-oxydianiline/phenylenediamine/tridecyl alcohol ethoxylate phosphate) copolymer, a poly(pyromellitic dianhydride/4,4-oxydianiline/polyethylene glycol tridecyl ether phosphate) copolymer, a poly(pyromellitic dianhydride/phenylenediamine/polyethylene glycol tridecyl ether phosphate) copolymer, a poly(biphenyl tetracarboxylic dianhydride/4,4'-oxydianiline/polyethylene glycol tridecyl ether phosphate) copolymer, poly(biphenyl tetracarboxylic dianhydride/phenylenediamine/polyethylene glycol tridecyl ether phosphate) copolymer, and a poly(benzophenone tetracarboxylic dianhydride/4,4'-oxydianiline/phenylenediamine/polyethylene glycol tridecyl ether phosphate) copolymer.

2. The intermediate transfer member in accordance with claim 1 wherein during said reaction the polyamic acid imidizes, and wherein said reaction is accomplished by heating said phosphate ester, and said polyamic acid at a temperature of from about 200 degrees Centigrade to about 350 degrees Centigrade and wherein said phosphate ester modified polyimide is selected from the group consisting of (poly(pyromellitic dianhydride/4,4-oxydianiline/nonylphenol ethoxylate phosphate) copolymer, poly(pyromellitic dianhydride/phenylenediamine/nonylphenol ethoxylate phosphate) copolymer, poly(biphenyl tetracarboxylic dianhydride/4,4'-oxydianiline/nonylphenol ethoxylate phosphate) copolymer, and poly(biphenyl tetracarboxylic dianhydride/phenylenediamine/nonylphenol ethoxylate phosphate) copolymer) and wherein said conductive component is carbon black.

3. The intermediate transfer member in accordance with claim 1 wherein said phosphate ester is nonylphenol ethoxylate phosphate, said conductive component is carbon black, and wherein said polyamic acid is a polyamic acid of pyromellitic dianhydride/4,4-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, and a polyamic acid of benzophenone tetracarboxylic dianhydride/4,4'-oxydianiline/phenylenediamine.

4. The intermediate transfer member in accordance with claim 1 wherein said phosphate ester is selected in an amount of from about 0.01 to about 5 weight percent, said polyamic acid is selected in an amount of from about 65 to about 97 weight percent, and said conductive component is present in an amount of from about 1 to about 30 weight percent, and the total thereof is about 100 percent, and where said phosphate ester reacts with said polyamic acid at a temperature of from about 180 to about 320° C.

5. The intermediate transfer member in accordance with claim 1 wherein said phosphate ester is selected in an amount of from about 0.1 to about 4 weight percent, said polyamic acid is selected in an amount of from about 78 to about 95 weight percent, and said conductive component is selected in an amount of from about 1 to about 20 weight percent, and the total thereof is about 100 percent and wherein said phosphate ester modified polyimide is selected from the group consisting of a (poly(pyromellitic dianhydride/4,4-oxydianiline/nonylphenol ethoxylate phosphate) copolymer, a poly(pyromellitic dianhydride/phenylenediamine/nonylphenol ethoxylate phosphate) copolymer, a poly(biphenyl tetracarboxylic dianhydride/4,4'-oxydianiline/nonylphenol ethoxylate phosphate) copolymer, and a poly(biphenyl tetracarboxylic dianhydride/phenylenediamine/nonylphenol ethoxylate phosphate) copolymer).

6. The intermediate transfer member in accordance with claim 1 wherein said reaction is conducted at a temperature of from about 160 to about 260° C.

7. The intermediate transfer member in accordance with claim 1 wherein said polyamic acid is selected from the group consisting of a polyamic acid of pyromellitic dianhydride/4,4-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/phenylenediamine, a polyamic acid of benzophenone tetracarboxylic dianhydride/4,4'-oxydianiline/phenylenediamine, each selected in an amount of from about 70 to about 97 weight percent of the transfer member components of said phosphate ester modified polyimide and said conductive component.

8. The intermediate transfer member in accordance with claim 1 wherein said conductive component is carbon back.

9. The intermediate transfer member in accordance with claim 1 wherein the ratio of said phosphate ester to said polyamic acid is from about 0.01/99.99 g to about 5/95, or wherein the ratio of said phosphate ester to said polyamic acid is from about 0.1/99.9 to about 2/98.

10. The intermediate transfer member in accordance with claim 1 wherein said phosphate ester modified polyimide is a (poly(pyromellitic dianhydride/4,4-oxydianiline/nonylphenol ethoxylate phosphate) copolymer.

11. The intermediate transfer member in accordance with claim 1 wherein said phosphate ester modified polyimide is selected from the group consisting of a (poly(pyromellitic dianhydride/4,4-oxydianiline/nonylphenol ethoxylate phosphate) copolymer, a poly(pyromellitic dianhydride/phenylenediamine/nonylphenol ethoxylate phosphate) copolymer, a poly(biphenyl tetracarboxylic dianhydride/4,4'- oxydianiline/nonylphenol ethoxylate phosphate) copolymer, and a poly(biphenyl tetracarboxylic dianhydride/phenylenediamine/nonylphenol ethoxylate phosphate) copolymer).

12. An intermediate transfer member comprised of a conductive material and a component selected from the group consisting of a poly(pyromellitic dianhydride/4,4-oxydianiline/nonylphenol ethoxylate phosphate) copolymer, a poly(pyromellitic dianhydride/phenylenediamine/nonylphenol ethoxylate phosphate) copolymer, a poly(biphenyl tetracarboxylic dianhydride/4,4'-oxydianiline/nonylphenol ethoxylate phosphate) copolymer, a poly(biphenyl tetracarboxylic dianhydride/phenylenediamine/nonylphenol ethoxylate phosphate) copolymer, poly(benzophenone tetracarboxylic dianhydride/4,4'-oxydianiline/phenylenediamine/nonylphenol ethoxylate phosphate) copolymer, a poly(pyromellitic dianhydride/4,4-oxydianiline/tridecyl alcohol ethoxylate phosphate) copolymer, a poly(pyromellitic dianhydride/phenylenediamine/tridecyl alcohol ethoxylate phosphate) copolymer, a poly(biphenyl tetracarboxylic dianhydride/4,4'-oxydianiline/tridecyl alcohol ethoxylate phosphate) copolymer, a poly(biphenyl tetracarboxylic dianhydride/phenylenediamine/tridecyl alcohol ethoxylate phosphate) copolymer, a poly(benzophenone tetracarboxylic dianhydride/4,4'-oxydianiline/phenylenediamine/tridecyl alcohol ethoxylate phosphate) copolymer, a poly(pyromellitic dianhydride/4,4-oxydianiline/polyethylene glycol tridecyl ether phosphate) copolymer, a poly(pyromellitic dianhydride/phenylenediamine/polyethylene glycol tridecyl ether phosphate) copolymer, a poly(biphenyl tetracarboxylic dianhydride/4,4'-oxydianiline/polyethylene glycol tridecyl ether phosphate) copolymer, poly(biphenyl tetracarboxylic dianhydride/phenylenediamine/polyethylene glycol tridecyl ether phosphate) copolymer, and a poly(benzophenone tetracarboxylic dianhydride/4,4'-oxydianiline/phenylenediamine/polyethylene glycol tridecyl ether phosphate) copolymer.

13. The intermediate transfer member in accordance with claim 12 wherein said component is selected from the group consisting of a (poly(pyromellitic dianhydride/4,4-oxydianiline/nonylphenol ethoxylate phosphate) copolymer, a poly(pyromellitic dianhydride/phenylenediamine/nonylphenol ethoxylate phosphate) copolymer, a poly(biphenyl tetracarboxylic dianhydride/4,4'-oxydianiline/nonylphenol ethoxylate phosphate) copolymer, and a poly(biphenyl tetracarboxylic dianhydride/phenylenediamine/nonylphenol ethoxylate phosphate) copolymer.

14. The intermediate transfer member in accordance with claim 12 wherein said component is a (poly(pyromellitic dianhydride/4,4-oxydianiline/nonylphenol ethoxylate phosphate) copolymer.

15. The intermediate transfer member in accordance with claim 12 when said component is selected from the group consisting of a (poly(pyromellitic dianhydride/4,4-oxydianiline/nonylphenol ethoxylate phosphate) copolymer, a poly(pyromellitic dianhydride/phenylenediamine/nonylphenol ethoxylate phosphate) copolymer, a poly(biphenyl tetracarboxylic dianhydride/4,4'-oxydianiline/nonylphenol ethoxylate phosphate) copolymer, and a poly(biphenyl tetracarboxylic dianhydride/phenylenediamine/nonylphenol ethoxylate phosphate) copolymer) and said conductive material is carbon black.

* * * * *